(12) United States Patent
Lin et al.

(10) Patent No.: US 8,649,165 B2
(45) Date of Patent: Feb. 11, 2014

(54) ELECTRONIC APPARATUS AND DISPLAY PANEL MODULE

(75) Inventors: Hsin-Ta Lin, Taipei (TW); Po-Shou Chou, Taipei (TW); Ching-Feng Hsu, Taipei (TW)

(73) Assignee: Pegatron Corporation, Taipei (TW)

( * ) Notice: Subject to any disclaimer, the term of this patent is extended or adjusted under 35 U.S.C. 154(b) by 207 days.

(21) Appl. No.: 13/423,253

(22) Filed: Mar. 18, 2012

(65) Prior Publication Data

US 2012/0236482 A1    Sep. 20, 2012

(30) Foreign Application Priority Data

Mar. 18, 2011    (TW) .............................. 100109295 A

(51) Int. Cl.
*G06F 1/16* (2006.01)

(52) U.S. Cl.
USPC ....... 361/679.24; 348/342; 345/173; 248/917

(58) Field of Classification Search
USPC ............ 348/790, 794, 342; 349/58, 139, 153, 349/62; 361/679.01, 679.31, 679.26, 361/679.03, 679.21, 679.04, 679.48, 361/679.27, 679.02, 679.08, 679.05, 361/679.57, 679, 22, 679.23, 679.24, 361/679.06, 679.34, 679.17; 345/175, 173; 345/1.3, 204, 102, 87, 211, 156, 60; 362/602, 609, 124, 97.1, 632; 248/294.1, 222.14, 284.1, 285.1, 917, 248/921, 475.1

See application file for complete search history.

(56) References Cited

U.S. PATENT DOCUMENTS

| | | | |
|---|---|---|---|
| 7,271,861 B2 | 9/2007 | Yamazaki | |
| 7,599,016 B2 * | 10/2009 | Lo et al. | ........................ 349/56 |
| 8,049,835 B2 * | 11/2011 | Cheng et al. | .................... 349/58 |
| 2004/0160422 A1 | 8/2004 | Choi et al. | |
| 2010/0259501 A1 | 10/2010 | Lin | |
| 2013/0194512 A1 * | 8/2013 | Nishimoto et al. | ........... 348/790 |

FOREIGN PATENT DOCUMENTS

| | | |
|---|---|---|
| CN | 201307380 Y | 9/2009 |
| TW | 201037396 A | 10/2010 |

OTHER PUBLICATIONS

Taiwan Office Action dated Oct. 1, 2013.
China Office Action dated Jul. 31, 2013.
English translation of abstract of CN 201307380 Y (published Sep. 9, 2009).

* cited by examiner

*Primary Examiner* — Hung Duong
(74) *Attorney, Agent, or Firm* — McClure, Qualey & Rodack, LLP

(57) ABSTRACT

An electronic apparatus and a display panel module are disclosed. The display panel module includes a frame, a display panel, and a removable element. A first end of the removable element is fixed on the display panel, and a second end of the removable element is removably fixed on an inner wall of the frame to make the display panel not contact with the frame.

20 Claims, 4 Drawing Sheets

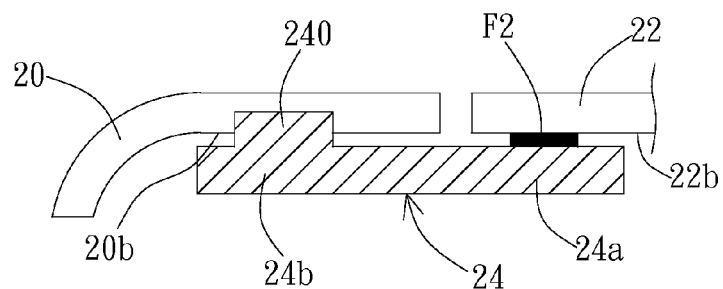
FIG. 6
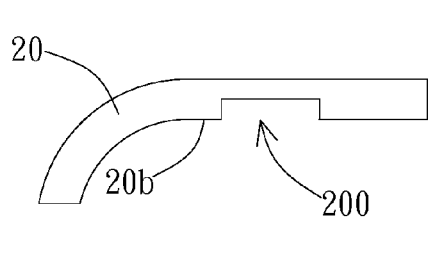 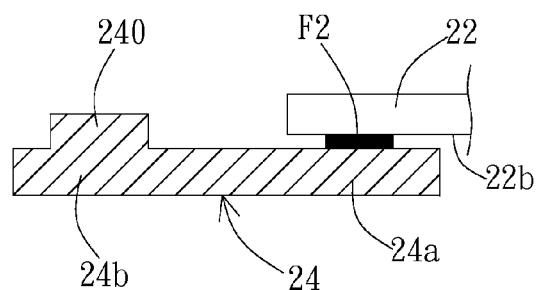
FIG. 7  FIG. 8

ELECTRONIC APPARATUS AND DISPLAY PANEL MODULE

BACKGROUND

1. Technology Field

The disclosure relates to a display; in particular, to an electronic apparatus and a display panel module.

2. Description of the Related Art

In recent years, with the progress of electronic technology, the tablet computer having a size between the conventional notebook and mobile communication apparatus becomes more and more popular.

In general, the display panel module of the tablet computer uses the touch display panel to display images and to input by touching it.

The known display panel module may use glue (a double sided tape) to adhere the touch panel and the frame to save assembling time. However, if the touch panel and the frame are not precisely aligned at first, and the touch panel and the frame are already assembled by glue, it is hard to separate the touch panel and the frame and align the touch panel and the frame again. When the touch panel needs to be repaired, it is hard to disassemble the touch panel since the touch panel and the frame are already adhered. Especially, the developing trend of the current touch panel is large-area and small-thickness. If the display panel module is disassembled by force, it is easy to cause the fragmentation of the glass substrate of the touch panel, the scratch of the ITO conductive film, or the fracture of the frame. Because the above-mentioned conventional way of assembling the touch panel and the frame has drawbacks of high manufacturing cost and hard to rework, it will result in a considerable degree of distress to the Tablet computer manufacturers.

SUMMARY

An embodiment of the invention is to disclose a display panel module. The display panel module includes a frame, a display panel, and a removable element. The removable element has a first end and a second end. The first end of the removable element is fixed on the display panel, and the second end of the removable element is removably fixed on the inner wall of the frame to make the display panel not contact with the frame.

In another embodiment, the display panel is a touch panel.

In another embodiment, the display panel module further includes a first fixing element used for removably fixing the second end of the removable element on the inner wall of the frame.

In another embodiment, a locking hole is disposed on the inner wall of the frame, and a through hole is disposed on the second end of the removable element, the first fixing element passes through the through hole and is locked by the locking hole to fix the second end of the removable element on the inner wall of the frame.

In another embodiment, a first embedding component is disposed on the inner wall of the frame, and a second embedding component is disposed on the second end of the removable element, the first embedding component is embedded in the second embedding component to make the second end of the removable element fixed on the inner wall of the frame.

In another embodiment, the first embedding component is a concave and the second embedding component is a convex, or the first embedding component is a convex and the second embedding component is a concave.

In another embodiment, the display panel module further includes a second fixing element used for fixing the first end of the removable element on the display panel.

In another embodiment, the second fixing element is disposed between the first end of the removable element and a back surface of the display panel to make the first end of the removable element fixed on the back surface of the display panel.

In another embodiment, the second fixing element is continuously disposed between the first end of the removable element and the back surface of the display panel.

In another embodiment, the second fixing element is discontinuously disposed on positions between the first end of the removable element and the back surface of the display panel.

In another embodiment, the second fixing element is formed by a viscous material.

Another scope of the invention is to disclose an electronic apparatus. The electronic apparatus includes a display panel module. The display panel module includes a frame, a display panel, and a removable element. The removable element has a first end and a second end. The first end of the removable element is fixed on the display panel, and the second end of the removable element is removably fixed on the inner wall of the frame to make the display panel not contact with the frame.

In another embodiment, the display panel is a touch panel.

In another embodiment, the display panel module further includes a first fixing element used for removably fixing the second end of the removable element on the inner wall of the frame.

In another embodiment, a locking hole is disposed on the inner wall of the frame, and a through hole is disposed on the second end of the removable element, the first fixing element passes through the through hole and is locked by the locking hole to fix the second end of the removable element on the inner wall of the frame.

In another embodiment, a first embedding component is disposed on the inner wall of the frame, and a second embedding component is disposed on the second end of the removable element, the first embedding component is embedded in the second embedding component to make the second end of the removable element fixed on the inner wall of the frame.

In another embodiment, the first embedding component is a concave and the second embedding component is a convex, or the first embedding component is a convex and the second embedding component is a concave.

In another embodiment, the display panel module further includes a second fixing element used for fixing the first end of the removable element on the display panel.

In another embodiment, the second fixing element is disposed between the first end of the removable element and a back surface of the display panel to make the first end of the removable element fixed on the back surface of the display panel.

In another embodiment, the second fixing element is continuously disposed between the first end of the removable element and the back surface of the display panel.

In another embodiment, the second fixing element is discontinuously disposed on positions between the first end of the removable element and the back surface of the display panel.

In another embodiment, the second fixing element is formed by a viscous material.

The embodiment of the invention use two ends of the removable element to be fixed on the display panel and the inner wall of the frame to make the display panel not contact with the frame. Therefore, the assembled touch panel and frame can be disassembled at will, and the damage of the touch panel due to the adhering between the touch panel and the frame when they are disassembled in prior art can be also avoided. The electronic apparatus and the display panel module of the invention have advantages of easy to be assembled and low cost.

The advantage and spirit of the invention may be understood by the following detailed descriptions together with the appended drawings.

BRIEF DESCRIPTION OF THE APPENDED DRAWINGS

FIG. 6 illustrates a cross-sectional view of the display panel module in another preferred embodiment of the invention.

FIG. 7 illustrates a cross-sectional view of the frame shown in FIG. 6.

FIG. 8 illustrates a cross-sectional view of the adhered display panel and removable element shown in FIG. 6.

DETAILED DESCRIPTION

A preferred embodiment of the invention is a display panel module. In fact, the display panel module can be applied to any electronic apparatus having display function, such as a tablet computer or a smart phone, but not limited to this.

Figure 1:
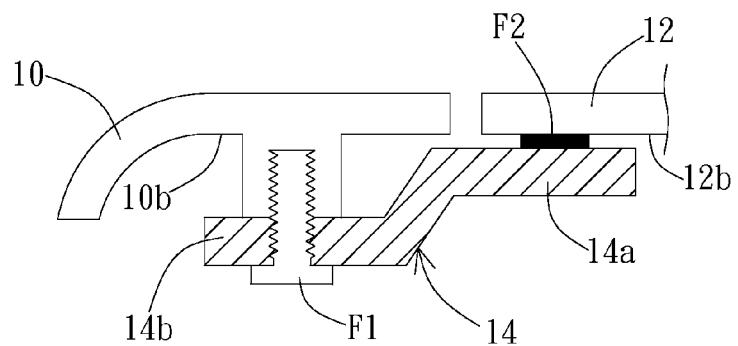
FIG. 1 illustrates a cross-sectional view of the display panel module in a preferred embodiment of the invention.
Figures 2, 3:
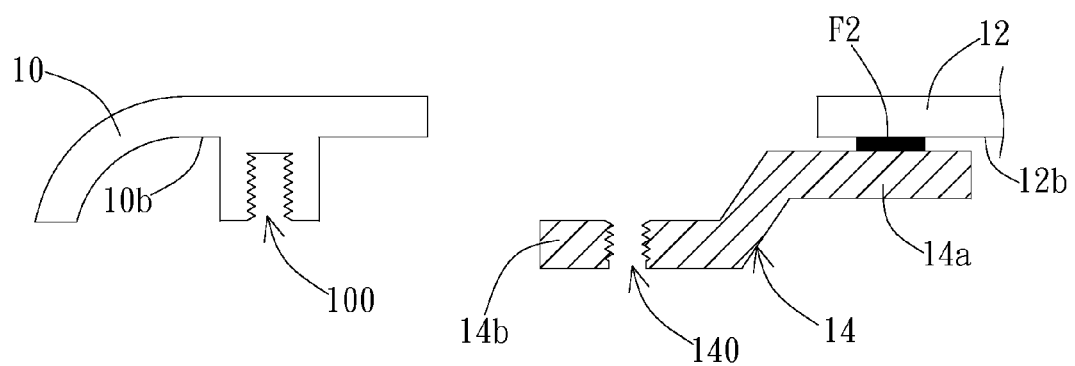
FIG. 2 illustrates a cross-sectional view of the frame shown in FIG. 1.
FIG. 3 illustrates a cross-sectional view of the adhered display panel and removable element shown in FIG. 1.

Please refer to FIG. 1 through FIG. 3. FIG. 1 illustrates a cross-sectional view of the display panel module 1 in this embodiment; FIG. 2 illustrates a cross-sectional view of the frame 10 shown in FIG. 1; FIG. 3 illustrates a cross-sectional view of the adhered display panel 12 and removable element 14 shown in FIG. 1. As shown in the figures, the display panel module 1 includes a frame 10, a display panel 12, a removable element 14, a first fixing element F1, and a second fixing element F2. A locking hole 100 is disposed on the inner wall 10b of the frame 10, and a through hole 140 is disposed on the second end 14b of the removable element 14.

In this embodiment, the display panel 12 may be a touch panel; the first fixing element F1 can be a screw; the locking hole 100 can a screw hole corresponding to the first fixing element F1; the second fixing element F2 can be a viscous material, such as a viscous glue, not limited to this. The materials of the frame 10 and the removable element 14 can be determined based on practical needs without any limitations.

A first end 14a of the removable element 14 is fixed on the display panel 12, and the second end 14b of the removable element 14 removably fixed on the inner wall 10b of the frame 10 to make the display panel 12 not contact with the frame 10. In detail, the first fixing element F1 passes through the through hole 140 and is locked by the locking hole 100 to fix the second end 14b of the removable element 14 on the inner wall 10b of the frame 10. The second fixing element F2 is disposed between the first end 14a of the removable element 14 and a back surface 12b of the display panel 12 to make the first end 14a of the removable element 14 and the back surface 12b of the display panel 12 adhesively fixed to each other by the second fixing element F2.

As shown in FIG. 1 through FIG. 3, it is known that if the user wants to separate the display panel 12 and the frame 10 of the display panel module 1 in FIG. 1, the user may loosen the first fixing element F1 originally fixed on the locking hole 100, so that the first fixing element F1 is separated from the locking hole 100 and the through hole 140 in order, and then the adhered removable element 14 and display panel 12 can be smoothly disassembled. Since the display panel 12 is not directly adhered to the frame 10, when the display panel module 1 is assembled, the display panel 12 will not be damaged to avoid the drawbacks in the known art.

Figure 4:
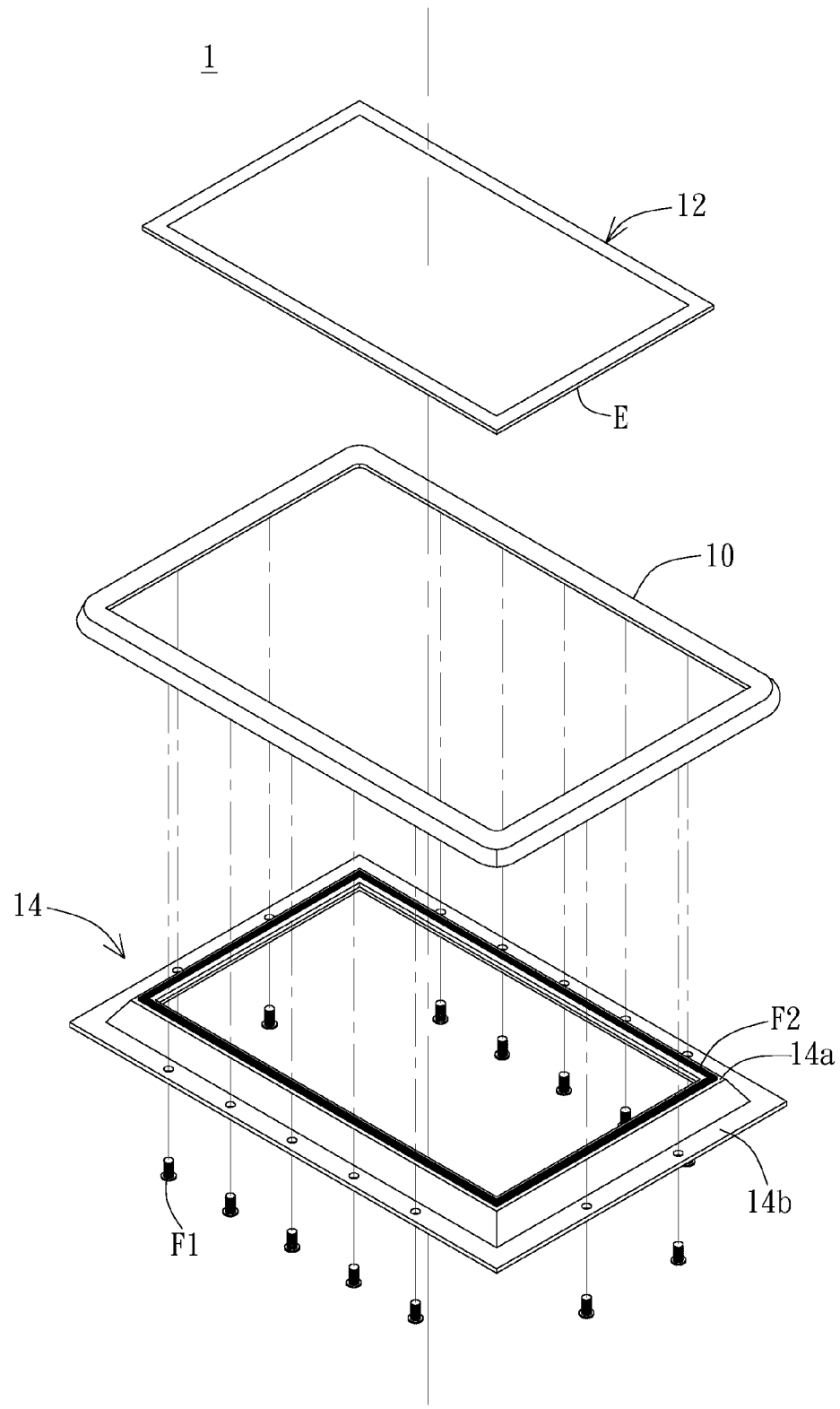
FIG. 4 and FIG. 5 illustrate different configurations of the second fixing element and the first end of the removable element respectively.
Figure 5:
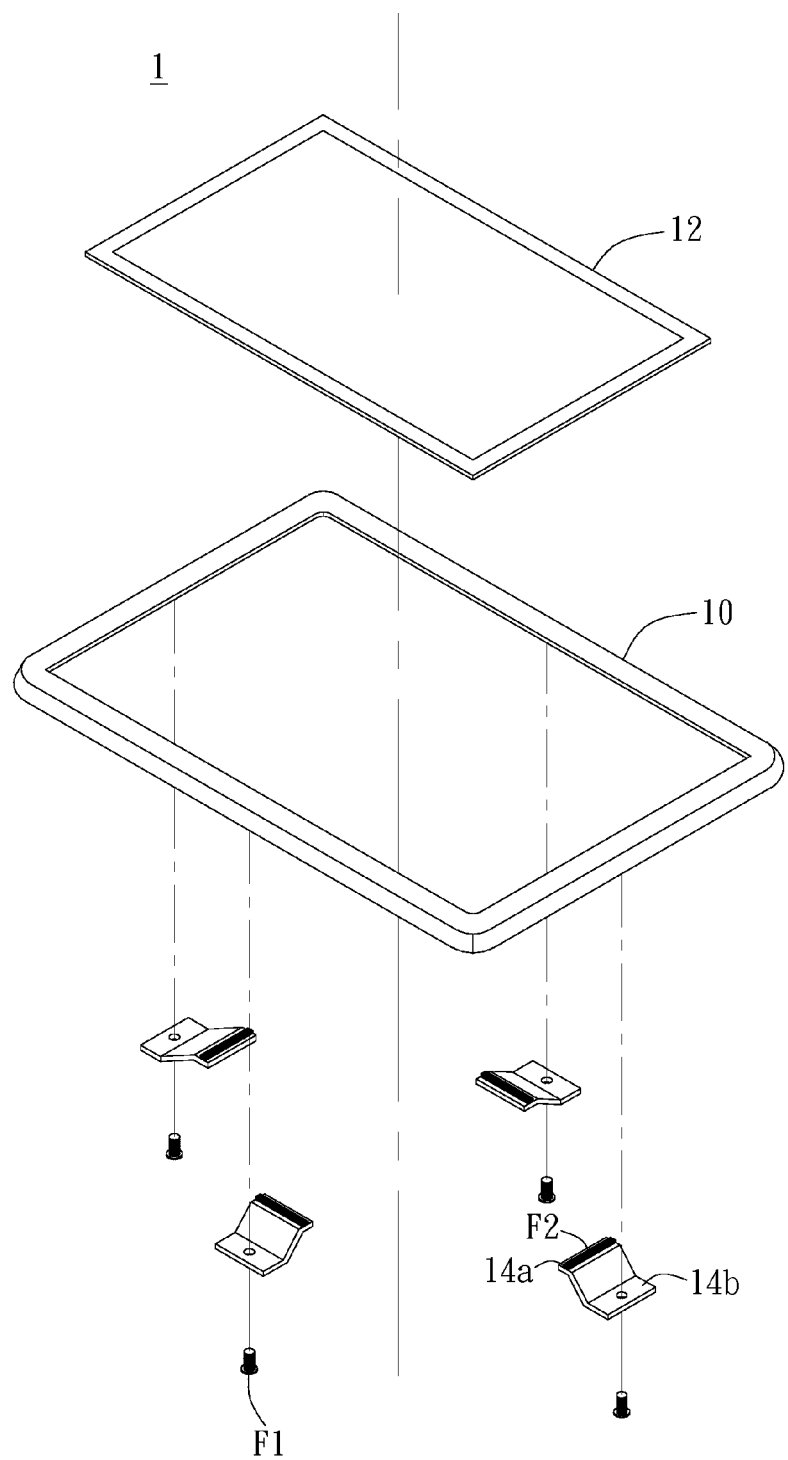

In practical applications, the second fixing element F2 may be continuously or discontinuously disposed on positions between the first end 14a of the removable element 14 and the back surface 12b of the display panel 12. Please refer to FIG. 4 and FIG. 5. FIG. 4 and FIG. 5 illustrate different configurations of the second fixing element F2 and the first end 14a of the removable element 14 respectively.

As shown in FIG. 4, the second fixing element F2 and the first end 14a of the removable element 14 are both continuously disposed surrounding the entire edge E of the back surface 12b of the display panel 12. That is to say, the entire edge E of the back surface 12b of the display panel 12 may be adhered to the first end 14a of the removable element 14 through the second fixing element F2. This configuration can assure that the display panel 12 is closely adhered to the first end 14a of the removable element 14.

As shown in FIG. 5, the second fixing element F2 and the first end 14a of the removable element 14 are both discontinuously disposed on some edge positions of the back surface 12b of the display panel 12 instead of the entire edge E of the back surface 12b of the display panel 12 shown in FIG. 4. That is to say, the first end 14a of the removable element 14 can be adhered to some edge positions of the back surface 12b of the display panel 12 through the second fixing element F2. This configuration can largely save the material cost of the second fixing element F2 and the removable element 14.

The above-mentioned embodiment discloses that the display panel module 1 can removably fix the second end 14b of the removable element 14 on the inner wall 10b of the frame 10 through the first fixing element F1. In fact, the removable element of the display panel module in the embodiment may be also removably fixed on the inner wall of the frame without any fixing elements.

Please refer to FIG. 6 through FIG. 8. FIG. 6 illustrates a cross-sectional view of the display panel module 2 in another embodiment of the invention. FIG. 7 illustrates a cross-sectional view of the frame 20 shown in FIG. 6. FIG. 8 illustrates a cross-sectional view of the adhered display panel 22 and removable element 24 shown in FIG. 6. As shown in the figures, the display panel module 2 includes a frame 20, a display panel 22, a removable element 24, and a second fixing element F2. A first embedding component 200 is disposed on the inner wall 20b of the frame 20, and a second embedding component 240 is disposed on the second end 24b of the removable element 24.

Because the first embedding component 200 is embedded in the second embedding component 240 to make the second end 24b of the removable element 24 fixed on the inner wall 20b of the frame 20. The second fixing element F2 is disposed between the first end 24a of the removable element 24 and a back surface 22b of the display panel 22 to make the first end 24a of the removable element 24 and the back surface 22b of the display panel 22 adhesively fixed to each other by the second fixing element F2.

It should be noticed that the first embedding component 200 may be a concave and the second embedding component 240 may be a convex shown in FIG. 6 through FIG. 8. However, in fact, the first embedding component 200 may be also a convex and the second embedding component 240 may be also a concave. The first embedding component 200 and the second embedding component 240 may form the embedded state correspondingly and not limited to the above-mentioned cases. The second end of the removable element of the display panel module in the invention may be also fixed on the inner wall of the frame through any other removable ways without any limitations.

Another preferred embodiment of the invention is an electronic apparatus. In fact, the electronic apparatus can be any electronic apparatus having a touch panel, such as a tablet computer or a smart phone, but not limited to this. In this embodiment, the electronic apparatus includes a display panel module. The display panel module includes a frame, a display panel, and a removable element. The removable element has a first end and a second end. The first end of the removable element is fixed on the display panel, and the second end of the removable element is removably fixed on the inner wall of the frame to make the display panel not contact with the frame.

In practical applications, the display panel module may further include a first fixing element and a second fixing element. The second fixing element is formed by a viscous material. The first fixing element is used for removably fixing the second end of the removable element on the inner wall of the frame. The second fixing element is used for fixing the first end of the removable element on the display panel. The second fixing element is disposed between the first end of the removable element and a back surface of the display panel to make the first end of the removable element and the back surface of the display panel adhesively fixed to each other by the second fixing element. In fact, the second fixing element may be continuously or discontinuously disposed on positions between the first end of the removable element and the back surface of the display panel.

In an embodiment, a locking hole is disposed on the inner wall of the frame, and a through hole is disposed on the second end of the removable element, the first fixing element passes through the through hole and is locked by the locking hole to fix the second end of the removable element on the inner wall of the frame.

In another embodiment, a first embedding component is disposed on the inner wall of the frame, and a second embedding component is disposed on the second end of the removable element, the first embedding component is embedded in the second embedding component to make the second end of the removable element fixed on the inner wall of the frame. In fact, the first embedding component is a concave and the second embedding component is a convex, or the first embedding component is a convex and the second embedding component is a concave.

The electronic apparatus and the display panel module of the invention use two ends of the removable element to be fixed on the display panel and the inner wall of the frame to make the display panel not contact with the frame. Therefore, the assembled touch panel and frame can be disassembled at will, and the damage of the touch panel due to the adhering between the touch panel and the frame when they are disassembled in prior art can be also avoided. The electronic apparatus and the display panel module of the invention have advantages of easy to be assembled and low cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A display panel module, comprising:
 a frame having an inner wall;
 a display panel; and
 a removable element having a first end and a second end, wherein the first end of the removable element is fixed on the display panel, and the second end of the removable element is removably fixed on the inner wall of the frame to make the display panel not contact with the frame.

2. The display panel module of claim 1, wherein the display panel is a touch panel.

3. The display panel module of claim 1, further comprising:
 a first fixing element, for removably fixing the second end of the removable element on the inner wall of the frame.

4. The display panel module of claim 3, wherein a locking hole is disposed on the inner wall of the frame, and a through hole is disposed on the second end of the removable element, the first fixing element passes through the through hole and is locked by the locking hole to fix the second end of the removable element on the inner wall of the frame.

5. The display panel module of claim 1, further comprising:
 a first embedding component disposed on the inner wall of the frame; and
 a second embedding component disposed on the second end of the removable element, wherein the first embedding component is embedded in the second embedding component to make the second end of the removable element fixed on the inner wall of the frame.

6. The display panel module of claim 5, wherein the first embedding component is a concave and the second embedding component is a convex, or the first embedding component is a convex and the second embedding component is a concave.

7. The display panel module of claim 1, further comprising:
 a second fixing element, for fixing the first end of the removable element on the display panel.

8. The display panel module of claim 7, wherein the second fixing element is disposed between the first end of the removable element and a back surface of the display panel to make the first end of the removable element fixed on the back surface of the display panel.

9. The display panel module of claim 8, wherein the second fixing element is continuously disposed between the first end of the removable element and the back surface of the display panel.

10. The display panel module of claim 8, wherein the second fixing element is discontinuously disposed on positions between the first end of the removable element and the back surface of the display panel.

11. The display panel module of claim 7, wherein the second fixing element is formed by a viscous material.

12. An electronic apparatus, comprising:
 a display panel module, comprising:
  a frame having an inner wall;
  a display panel; and
  a removable element having a first end and a second end, wherein the first end of the removable element is fixed on the display panel, and the second end of the removable element is removably fixed on the inner wall of the frame to make the display panel not contact with the frame.

13. The electronic apparatus of claim 12, wherein the display panel is a touch panel.

14. The electronic apparatus of claim 12, wherein the display panel module further comprising:
a first fixing element, for removably fixing the second end of the removable element on the inner wall of the frame.

15. The electronic apparatus of claim 14, wherein a locking hole is disposed on the inner wall of the frame, and a through hole is disposed on the second end of the removable element, the first fixing element passes through the through hole and is locked by the locking hole to fix the second end of the removable element on the inner wall of the frame.

16. The electronic apparatus of claim 12, wherein the display panel module further comprising:
a first embedding component disposed on the inner wall of the frame, and
a second embedding component disposed on the second end of the removable element, wherein the first embedding component is embedded in the second embedding component to make the second end of the removable element fixed on the inner wall of the frame.

17. The electronic apparatus of claim 16, wherein the first embedding component is a concave and the second embedding component is a convex, or the first embedding component is a convex and the second embedding component is a concave.

18. The electronic apparatus of claim 12, wherein the display panel module further comprising:
a second fixing element, for fixing the first end of the removable element on the display panel.

19. The electronic apparatus of claim 18, wherein the second fixing element is disposed between the first end of the removable element and a back surface of the display panel to make the first end of the removable element fixed on the back surface of the display panel.

20. The electronic apparatus of claim 19, wherein the second fixing element is formed by a viscous material.

* * * * *